United States Patent
Ebimoto et al.

(10) Patent No.: US 6,467,974 B1
(45) Date of Patent: Oct. 22, 2002

(54) TILTABLE DEVICE FOR CARRYING AN OBJECT THEREON

(75) Inventors: Naoki Ebimoto, Kokubunji; Tamiki Umemura, Isehara; Tetsuaki Imanishi, Kawasaki, all of (JP)

(73) Assignee: Shotoku Ltd., Kawasaki (JP)

( * ) Notice: Subject to any disclaimer, the term of this patent is extended or adjusted under 35 U.S.C. 154(b) by 48 days.

(21) Appl. No.: 09/633,743

(22) Filed: Aug. 7, 2000

(30) Foreign Application Priority Data

Aug. 11, 1999 (JP) .......................................... 11-227648

(51) Int. Cl.⁷ .......................... G03B 17/00; F16M 11/04
(52) U.S. Cl. .................... 396/419; 396/428; 248/187.1
(58) Field of Search ................ 396/419, 428; 248/187.1

(56) References Cited

U.S. PATENT DOCUMENTS 4,821,106 A * 4/1989 Fujita et al. ................ 358/229
4,959,671 A * 9/1990 Ishikawa ..................... 354/81
6,158,568 A * 12/2000 Erceg et al. ............ 198/370.04

FOREIGN PATENT DOCUMENTS

| GB | 1316250 | 5/1973 | |
|----|---------|--------|----|
| JP | 64-10719 | 2/1989 | .......... F16M/11/10 |
| JP | 2-27560 | 6/1990 | .......... F16M/11/10 |
| JP | 2-35198 | 8/1990 | .......... F16M/11/12 |
| WO | WO 92/09846 | 6/1992 | .......... F16M/11/10 |

* cited by examiner

*Primary Examiner*—David M. Gray
*Assistant Examiner*—Melissa J. Koval
(74) *Attorney, Agent, or Firm*—Frishauf, Holtz, Goodman & Chick, P.C.

(57) ABSTRACT

A tiltable device for carrying an object thereon includes a base, first and second rails arranged on the base and inclined such that they are located close to each other at one end and remote from each other at the other end, a first lateral link having opposite ends movably arranged on the first and second rails, respectively, a second lateral link parallel to the first lateral link and serving as a tiltable base for carrying an object thereon, and first and second vertical links parallel to each other and each rotatably connected to the first and second lateral links for holding the first and second lateral links together.

9 Claims, 12 Drawing Sheets

TILTABLE DEVICE FOR CARRYING AN OBJECT THEREON

BACKGROUND OF THE INVENTION

The present invention relates to a device for carrying an object thereon, such as a pan head on which a broadcasting television (TV) camera, for example, is placed, and more particularly, to a tiltable-type object carrying device permitting a TV camera placed thereon to be swiveled and tilted for shooting a scene.

In pan heads of this type in general, when an object placed thereon is inclined, or tilted, with respect to an axis of horizontal rotation, the center of gravity of the object lowers and thus, in some cases, the object falls down. To prevent this, a technique is employed, as disclosed in Examined Japanese Patent Publication (KOKOKU) No. 2-27560, for example, in which a spring balancing with the weight of the object is used. However, this technique is generally applicable only to the case where a lightweight object such as a small-sized video camera is placed on the pan head, though the bearable weight varies depending on the spring capacity.

In the case of supporting a heavy object such as a large-sized camera equipped with a long focal-distance lens system, a pan head called cam head is often used. Such a cam head includes a cam and a cam follower, as disclosed in British Patent No. 1,316,250 and Examined Japanese Patent Publication No. 2-35198, for example, and as an object placed on the cam head is tilted, the center of gravity thereof shifts horizontally such that the potential energy remains the same.

Apart from these types of cam head, Examined Japanese Patent Publication No. 64-10719 discloses an object carrying device with a different structure utilizing a Reuleaux mechanism known in the art, wherein a pair of sliding rods arranged in an inverted-V form are rotatably attached to opposite sides of a supporting base for carrying an object thereon and are moved along guide rollers when the object is to be tilted. Also, the publication of WO92/09846 discloses a device using a combination of special link mechanisms. In both of these devices, as an object placed thereon is tilted, the center of gravity thereof shifts horizontally.

The cam heads mentioned above are associated with a problem that the cam needs to be replaced with one having a different shape in accordance with the height of the center of gravity of an object to be placed on the cam head. Accordingly, each time the height of the center of gravity changes due to replacement of cameras or lenses, the cam must be replaced with a suitable one, and this makes the preparatory work for shooting complicated.

On the other hand, the technique disclosed in Examined Japanese Patent Publication No. 64-10719 and that described in the publication of WO92/09846 can cope with change in the height of the center of gravity of the object, without requiring complicated adjustment such as replacement of cams.

However, according to the technique disclosed in Examined Japanese Patent Publication No. 64-10719, in order to obtain a large tilt angle, it is necessary that extremely long sliding rods should be used. The technique described in the publication of WO92/09846, on the other hand, requires a complicated link mechanism, and accordingly, the sliding rods or links need to have high rigidity. If the sliding rods or links are made of a commonly used material or have ordinary dimensions, they will possibly be deflected or fractured.

BRIEF SUMMARY OF THE INVENTION

The present invention was created to solve the above problems, and an object thereof is to provide a tiltable-type object carrying device which enables the center of gravity of an object placed thereon to shift horizontally with tilting of the object and which also requires only a simple operation to cope with change in the height of the center of gravity of the object.

According to the present invention, there is provided a tiltable device for carrying an object thereon, comprising: a base; first and second rails arranged on the base and inclined such that the first and second rails are located close to each other at one end and remote from each other at other end; a first lateral link having opposite ends movably arranged on the first and second rails, respectively; a second lateral link parallel to the first lateral link and serving as a tiltable base for carrying an object thereon; and first and second vertical links parallel to each other and each rotatably connected to the first and second lateral links for holding the first and second lateral links together.

Preferably, an orientation control section is provided for maintaining vertical orientation of the first and second vertical links. The orientation control section includes a horizontal portion horizontally movable relative to the base, a vertical portion extending vertically from the horizontal portion, and holding means permitting one of the first vertical link, the second vertical link and a third vertical link connected to the first and second lateral links to be vertically movably held by the vertical portion. Alternatively, the orientation control section includes a supporting member arranged on the base, and a pair of lateral links rotatably supported at one end by the supporting member and rotatably supported at other end by one of the first vertical link, the second vertical link and a third vertical link connected to the first and second lateral links, wherein the supporting member, the pair of lateral links, and the above one of the first vertical link, the second vertical link and the third vertical link connected to the first and second lateral links constitute a parallelogrammic link.

Further preferably, adjusting means is provided which is coupled to the first and second rails for adjusting an angle of inclination thereof. The adjusting means includes first and second nuts coupled to the first and second rails, respectively, and a threaded rod having a first threaded portion on which the first nut is fitted, and a second threaded portion on which the second nut is fitted and which has a thread cut in a different direction from that of the first threaded portion.

DETAILED DESCRIPTION OF THE INVENTION

The present invention will be hereinafter described in detail.

Figure 1:
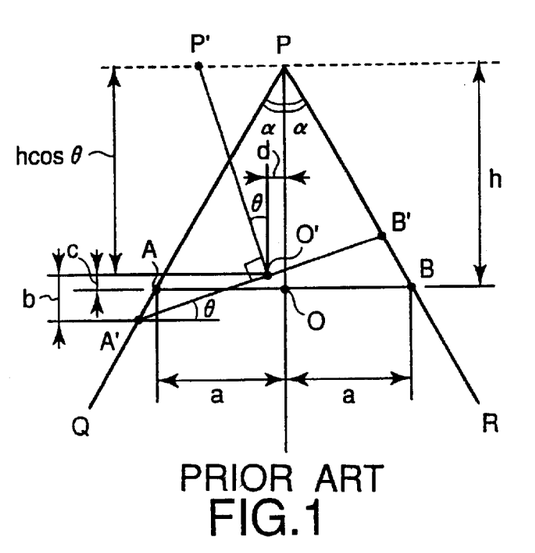
FIG. 1 is a diagram illustrating a Reuleaux mechanism known in the art.

The present invention basically utilizes a Reuleaux mechanism known in the art. FIG. 1 is a diagram illustrating a Reuleaux mechanism conventionally used. As points A and B of a link /AB ("/" represents line segment) with a length of 2a slide on respective inclined planes /PQ and /PR (half vertex angle: $\alpha$), point P (/OP=h) located above the middle point O of the link /AB follows a straight locus, as indicated by the dotted line. In this case, point O follows an elliptic locus. Accordingly, if a TV camera or the like is placed on /AB as a tilting base with the center of gravity thereof positioned at point P, the center of gravity, P, shifts horizontally irrespective of tilt angle $\theta$. As a result, the potential energy undergoes no change and the object remains stationary while being tilted.

However, where /AB is used directly as the tilting base, point A or B, for example, point B' shown in FIG. 1, approaches the vertex P of the inclined planes with increase in the tilt angle $\theta$. To obtain a large tilt angle $\theta$, therefore, it is necessary that the inclined planes extend up to points near the center of gravity of the object. This, however, causes interference between the object and the inclined planes, making it difficult to design a practical object carrying device.

Figure 2A:
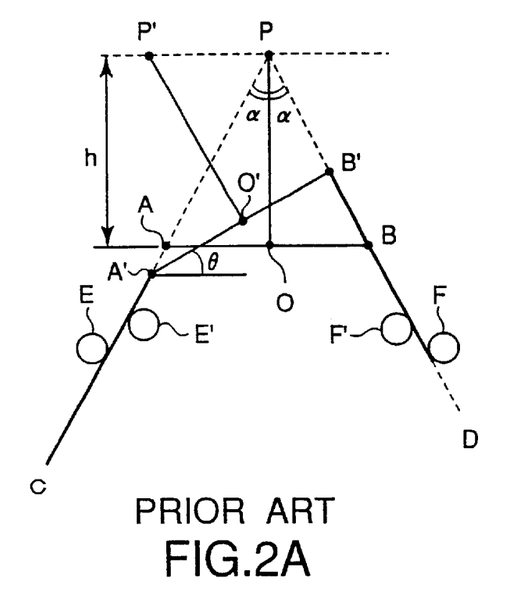
FIG. 2A is a diagram illustrating the principle of a device disclosed in Examined Japanese Patent Publication No. 64-10719.

To solve the problem, the device disclosed in Examined Japanese Patent Publication No. 64-10719 mentioned above uses, instead of the fixed inclined planes, sliding rods /AC and /BD attached to points A and B of the tilting base and having the same effects as the inclined planes, as shown in FIG. 2A, and the directions of movement of the sliding rods /AC and /BD are restricted by respective pairs of fixed rollers E, E' and F, F'. To obtain a large tilt angle $\theta$ with this arrangement, however, the sliding rods /AC and /BD need to have a large length, giving rise to a problem of rigidity of the sliding rods.

Figure 2B:
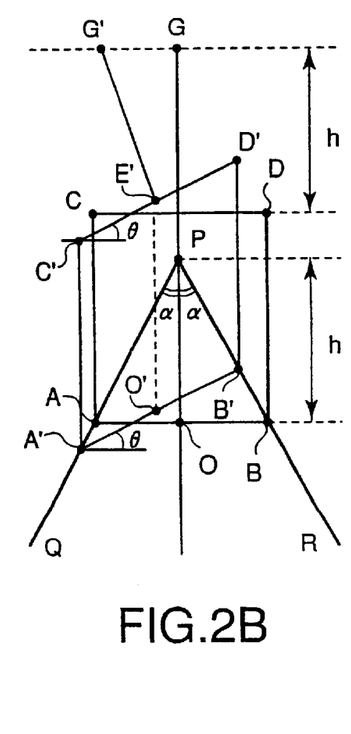
FIG. 2B is a diagram illustrating the principle of a device according to the present invention.

According to the present invention, on the other hand, as shown in FIG. 2B, a link /AB slidable on inclined planes /PQ and /PR and a tilting base /CD on which a TV camera or the like is placed are provided separately from each other, thus constituting a parallelogrammic link /ABCD including the link /AB and the tilting base /CD. This arrangement prevents the inclined planes from interfering with the object even if the tilt angle $\theta$ is large.

Figure 3:
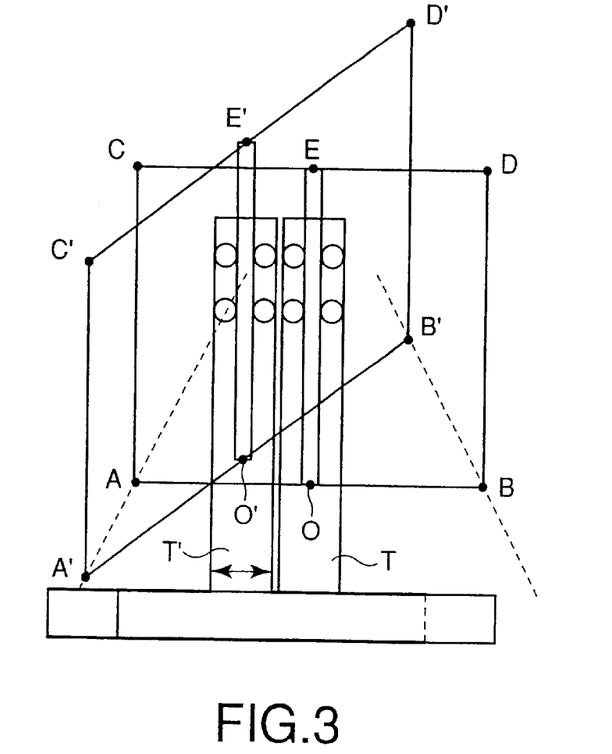
FIG. 3 is a schematic diagram showing an example of an orientation control section of the device according to the present invention.

Preferably, in this case, an orientation control section as shown in FIG. 3 is provided to prevent the parallelogrammic link /ABCD from collapsing. In the illustrated example, a vertically movable link /EO, for example, is arranged at a vertical portion of a supporting member T horizontally movable relative to a base and having an inverted-T shape, and the parallelogrammic link /ABCD is supported by the vertical link /EO. With this arrangement, vertical links /AC and /BD can always be oriented vertically and the parallelogrammic link never collapses.

Figure 4A:
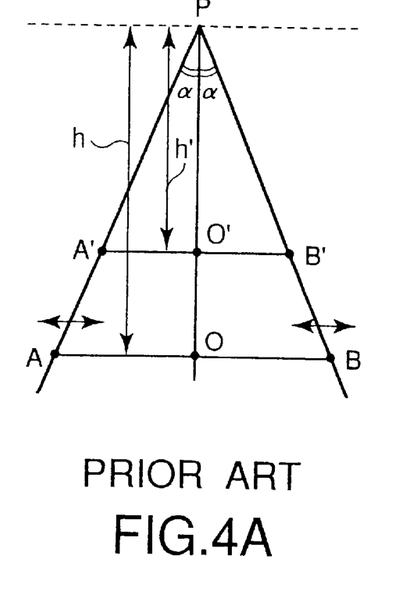
FIG. 4A is a diagram illustrating how change in the height of the center of gravity of an object is coped with by the device disclosed in Examined Japanese Patent Publication No. 64-10719.
Figure 4B:
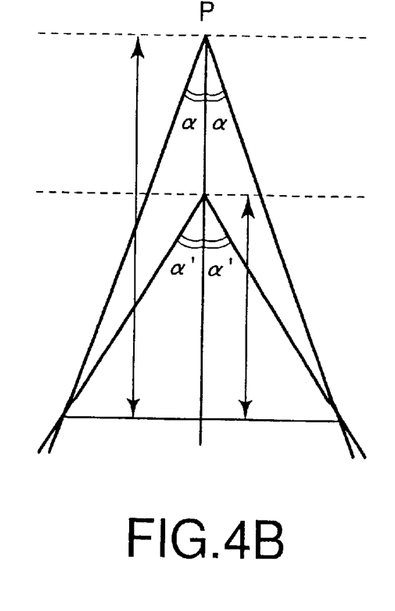
FIG. 4B is a diagram illustrating how change in the height of the center of gravity of an object is coped with by the device according to the present invention.

FIGS. 4A and 4B illustrate measures to cope with change in the height h of the center of gravity of the object. FIG. 4A illustrates the method used in the device disclosed in Examined Japanese Patent Publication No. 64-10719, in which the length of the link /AB is adjusted while the half vertex angle $\alpha$ of the inclined planes is not changed.

FIG. 4B shows the arrangement according to the present invention, in which the half vertex angle $\alpha$ of the inclined planes is changed while the length of the link /AB is not changed. As seen from FIG. 1, a=h tan $\alpha$ and thus h=a/tan $\alpha$; therefore, h greatly varies even with a slight change of $\alpha$. More specifically, according to the present invention, supporting members on which the inclined planes are fixed are rotatably connected to the base and are turned relative to each other to change the vertex angle of the inclined planes, thereby coping with change in the height of the center of gravity of the object.

An object carrying device (pan head) according to a first embodiment of the present invention will be now described.

Figure 5:
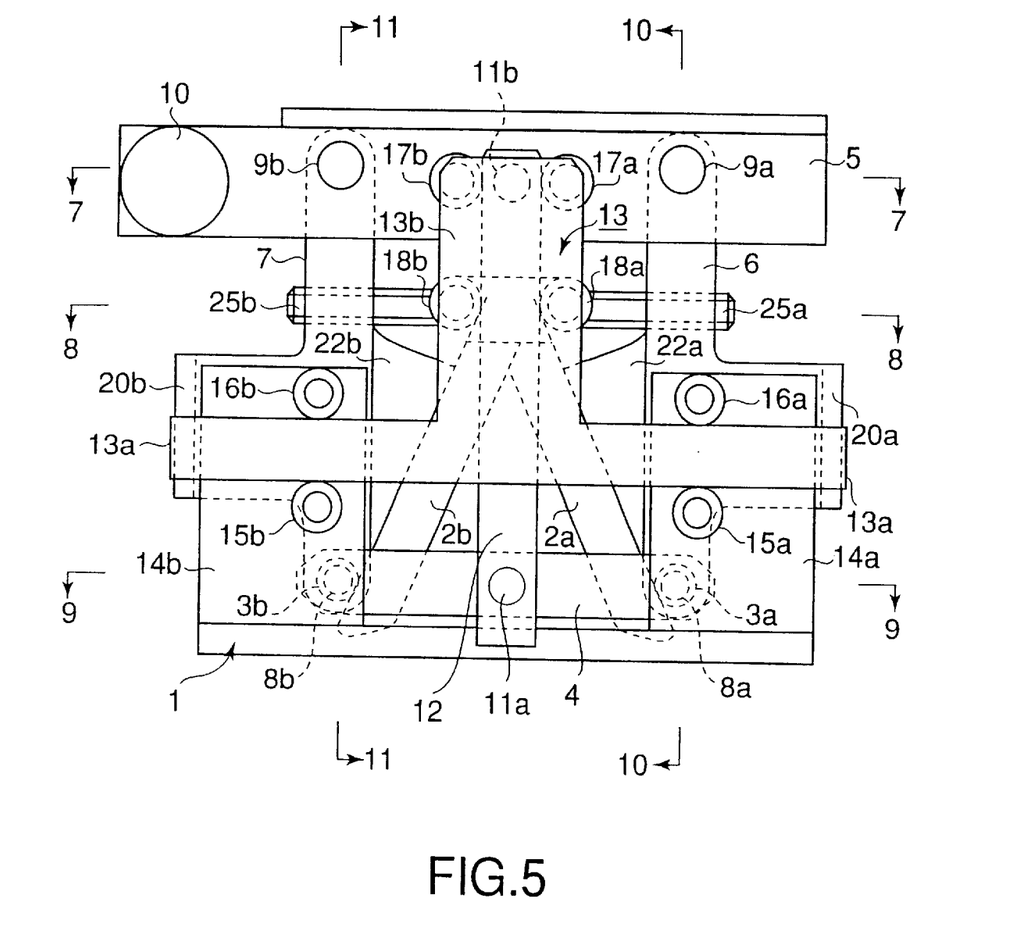
FIG. 5 is a side view of an object carrying device according to a first embodiment of the present invention.

FIG. 5 is a side view showing a first side of the object carrying device according to the first embodiment of the invention. A second side of the device opposite the first side has an arrangement similar to that shown in the figure. A base 1 is provided with a pair of inclined rails 2a and 2b. Rollers 3a and 3b, which roll on the inclined rails 2a and 2b, respectively, are rotatably coupled via a shaft and a bearing to opposite ends of a first lateral link 4 constituting one side of a parallelogrammic link. The parallelogrammic link is formed by the first lateral link 4, a tilting base 5 as a second lateral link, and first and second vertical links 6 and 7. The first vertical link 6 has opposite ends rotatably coupled, via respective shafts 8a and 9a, to one end of the first lateral link 4 and one end portion of the tilting base 5. The second vertical link 7 has opposite ends rotatably coupled, via respective shafts 8b and 9b, to the other end of the first lateral link 4 and the other end portion of the tilting base 5. The rollers 3a and 3b are respectively coaxial with the shafts 8a and 8b.

An orientation control section, which serves to maintain the vertical orientation of the first and second vertical links 6 and 7 of the parallelogrammic link, is constituted by a third vertical link 12, a supporting member 13 having an inverted-T shape, etc. The third vertical link 12 has opposite ends rotatably coupled, via respective shafts 11a and 11b, to intermediate portions of the first lateral link 4 and the tilting base 5. The supporting member 13 has a horizontal portion 13a and a vertical portion 13b, and the vertical portion 13b is provided with rollers 17a, 17b and 18a, 18b for vertically movably supporting the third vertical link 12. The horizontal portion 13a of the supporting member 13 is horizontally movably supported by rollers 15a, 15b and 16a, 16b mounted to brackets 14a and 14b which are secured to the base 1.

With the arrangement described above, as the tilting base 5 is tilted, the rollers 3a and 3b at opposite ends of the first lateral link 4 roll on the inclined rails 2a and 2b, respectively. As a result, the first lateral link 4 is inclined with the third vertical link 12 moved in both horizontal and vertical directions, but the vertical orientation of the third vertical link 12 is maintained due to the action of the inverted T-shaped supporting member 13. Consequently, the first and second vertical links 6 and 7 also are always kept in their vertically oriented state, so that the parallelogrammic link does not collapse, and the tilt of the tilting base 5 is transmitted directly to the first lateral link 4.

Figure 6:
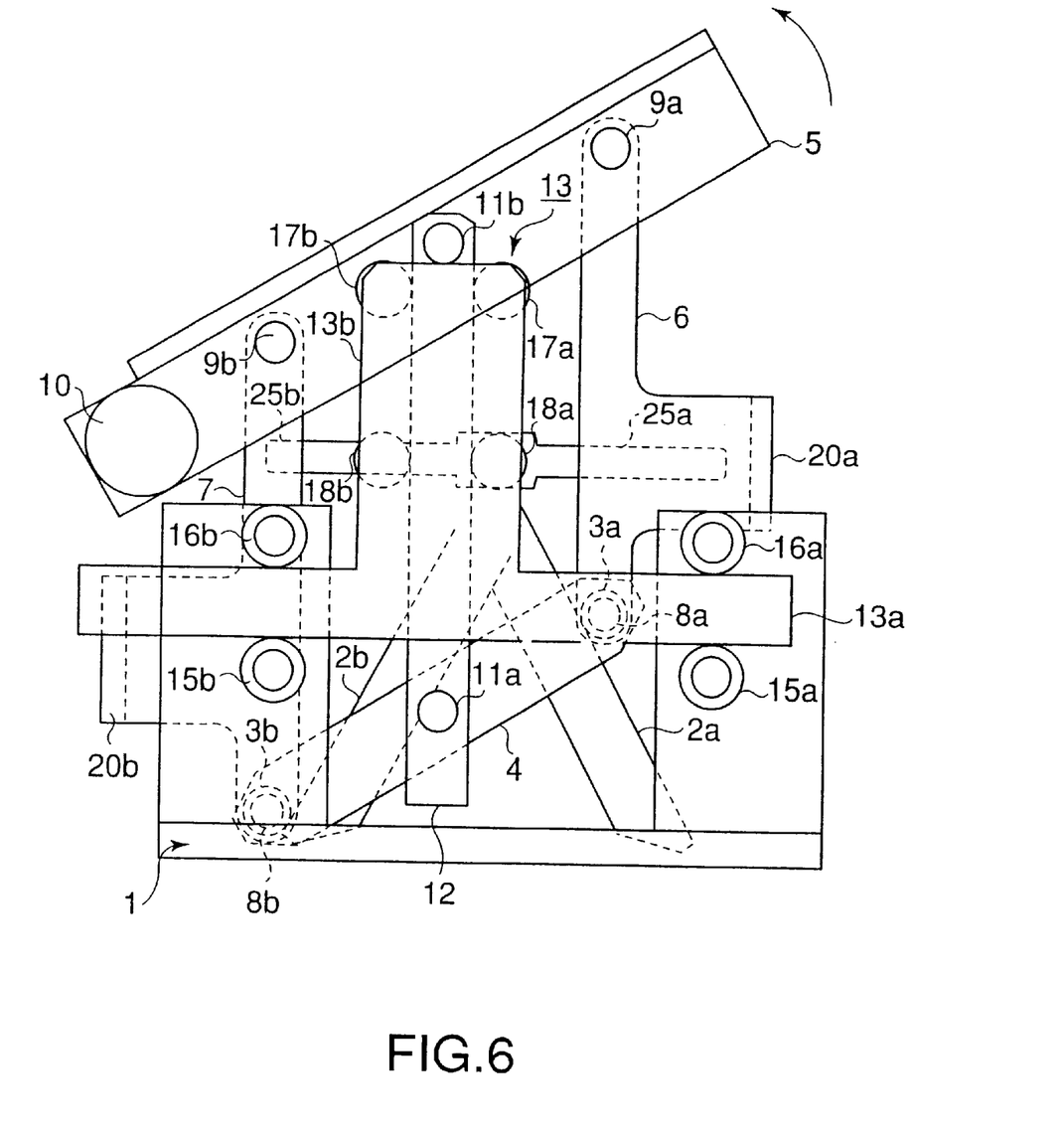
FIG. 6 is a side view of the device shown in FIG. 5, illustrating a tilting base tilted in a counterclockwise direction.

FIG. 6 shows a state in which the tilting base 5 is tilted counterclockwise with the rollers 3a and 3b situated at upper and lower portions, respectively, of the inclined rails 2a and 2b. When the tilting base 5 is tilted clockwise, the positions of the rollers 3a and 3b relative to the inclined rails 2a and 2b are reverse to those illustrated in the figure.

The base 1 is fixed to a tripod or the like and a panning mechanism, not shown, is provided to permit the base 1 to swivel round a vertical axis. Also, a TV camera attachment mechanism, not shown, is attached to the tilting base 5 to permit a TV camera or the like to be mounted on the base 5. The tilting base 5 is also provided with a pan bar mount 10, to which is attached an operating rod (pan rod), not shown, for panning (swiveling) and tilting (inclining) the object carrying device (pan head).

Referring now to FIGS. 7 through 12, the object carrying device will be described in more detail.

As mentioned above, the second side of the device has an arrangement similar to that of the first side, and the inclined rails 2a and 2b, the parallelogrammic link, and the orientation control section including the inverted T-shaped supporting member 13 are provided on both the first and second sides of the pan head in a symmetrical manner. In FIGS. 7 to 12, those inclined rails, parallelogrammic link and inverted V-shaped supporting member which are arranged on the second side of the pan head are indicated by the same reference numerals as those denoting the corresponding elements on the first side but with the prime (').

FIGS. 7 to 11 are sectional views taken along lines 7—7, 8—8, 9—9, 10—10 and 11—11, respectively, shown in FIG. 5. As shown in the figures, the first vertical links 6 and 6' are individually made up of a pair of link members 6a, 6b and 6a', 6b'. The reason is as follows. The inclined rails 2a, 2b and 2a', 2b' intersect as shown in FIG. 5, and in order to prevent interference between the inclined rails, the mounting positions for the inclined rails 2a and 2b and those for the inclined rails 2a' and 2b' are shifted from each other. In this arrangement, the first lateral links 4 and 4' are coupled to the respective rollers 3a and 3a' by means of short shafts, and to this end, the first vertical links 6 and 6' are individually constituted by a pair of link members 6a, 6b and 6a', 6b'.

Figure 7:
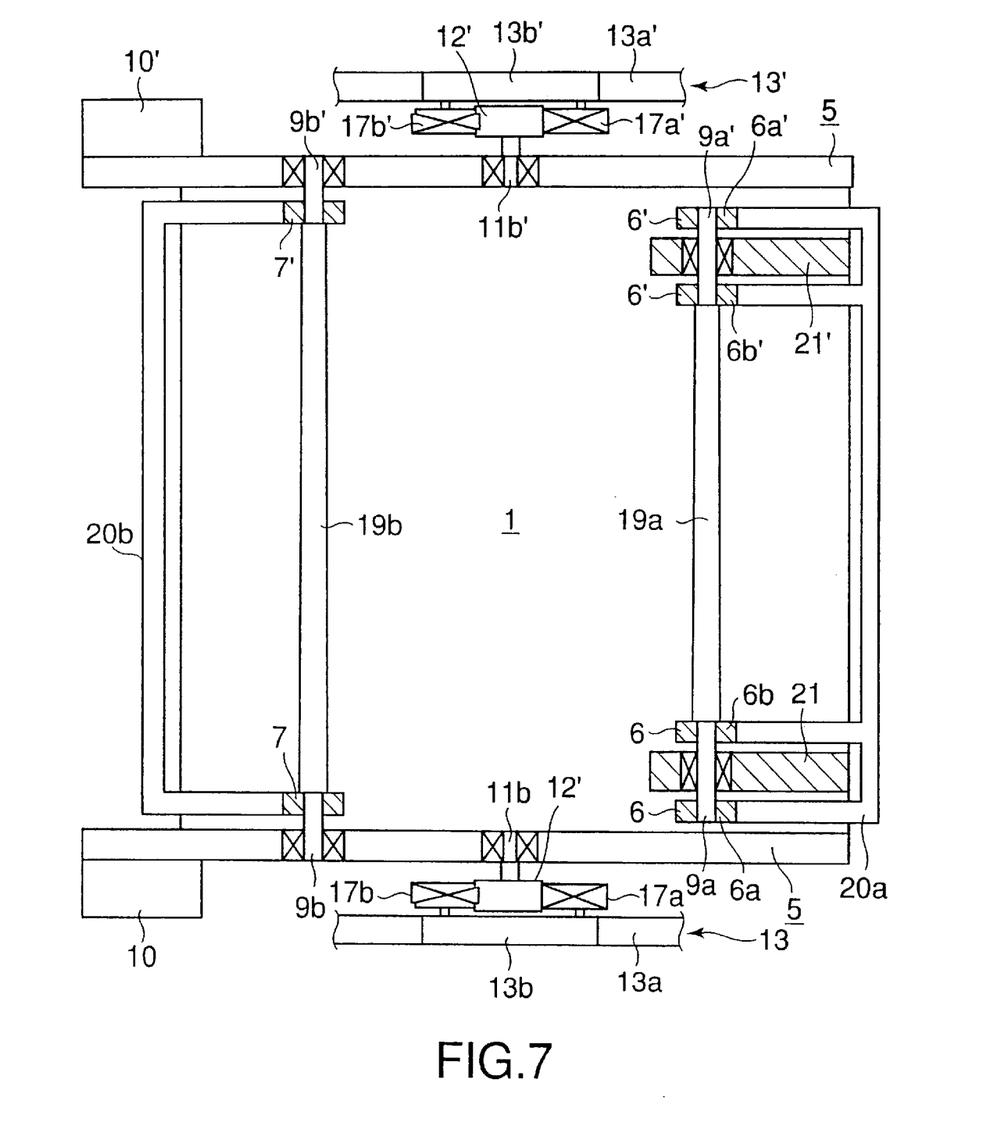
FIG. 7 is a sectional view taken along line 7—7 in FIG. 5.
Figure 9:
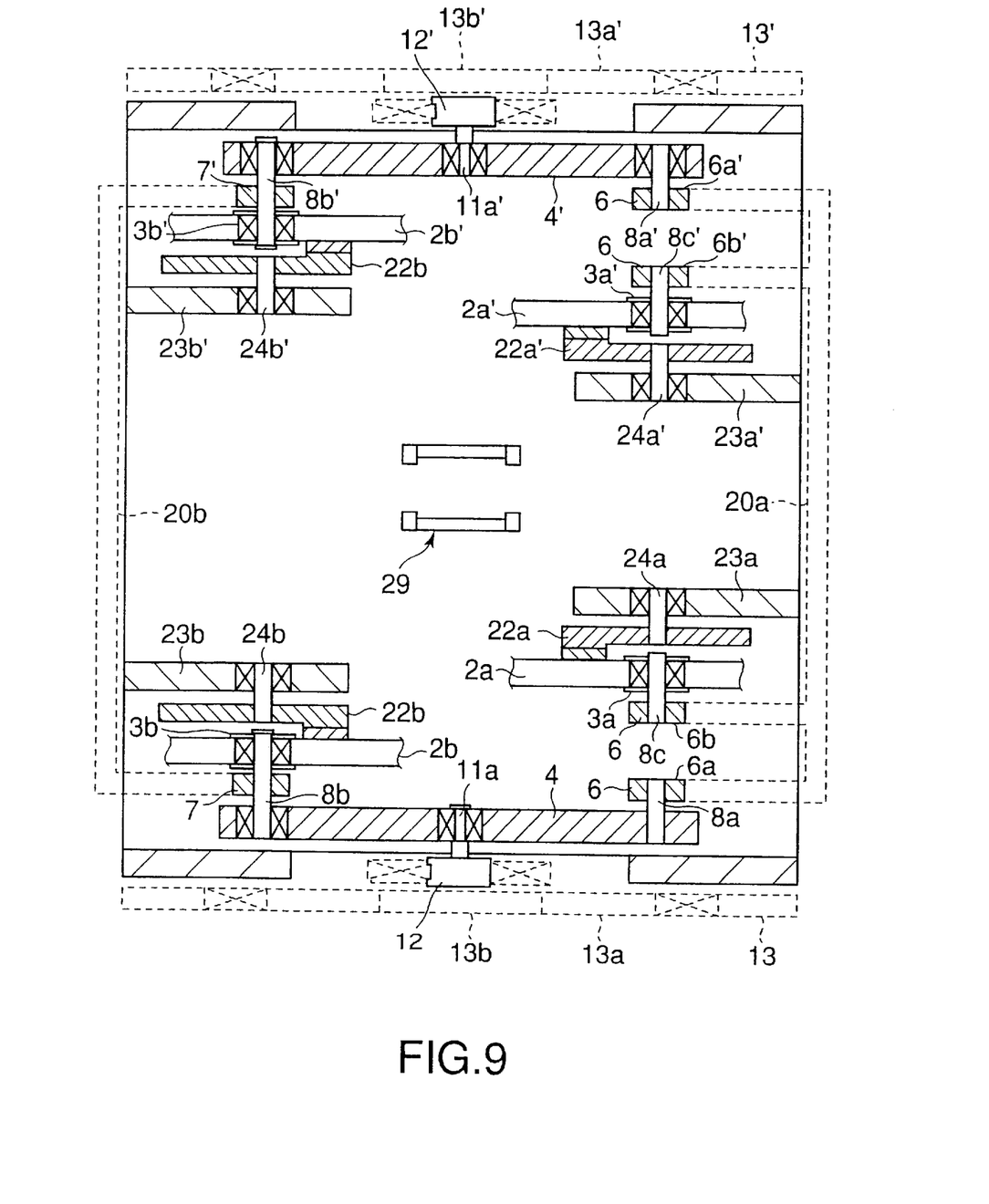
FIG. 9 is a sectional view taken along line 9—9 in FIG. 5.
Figure 10:
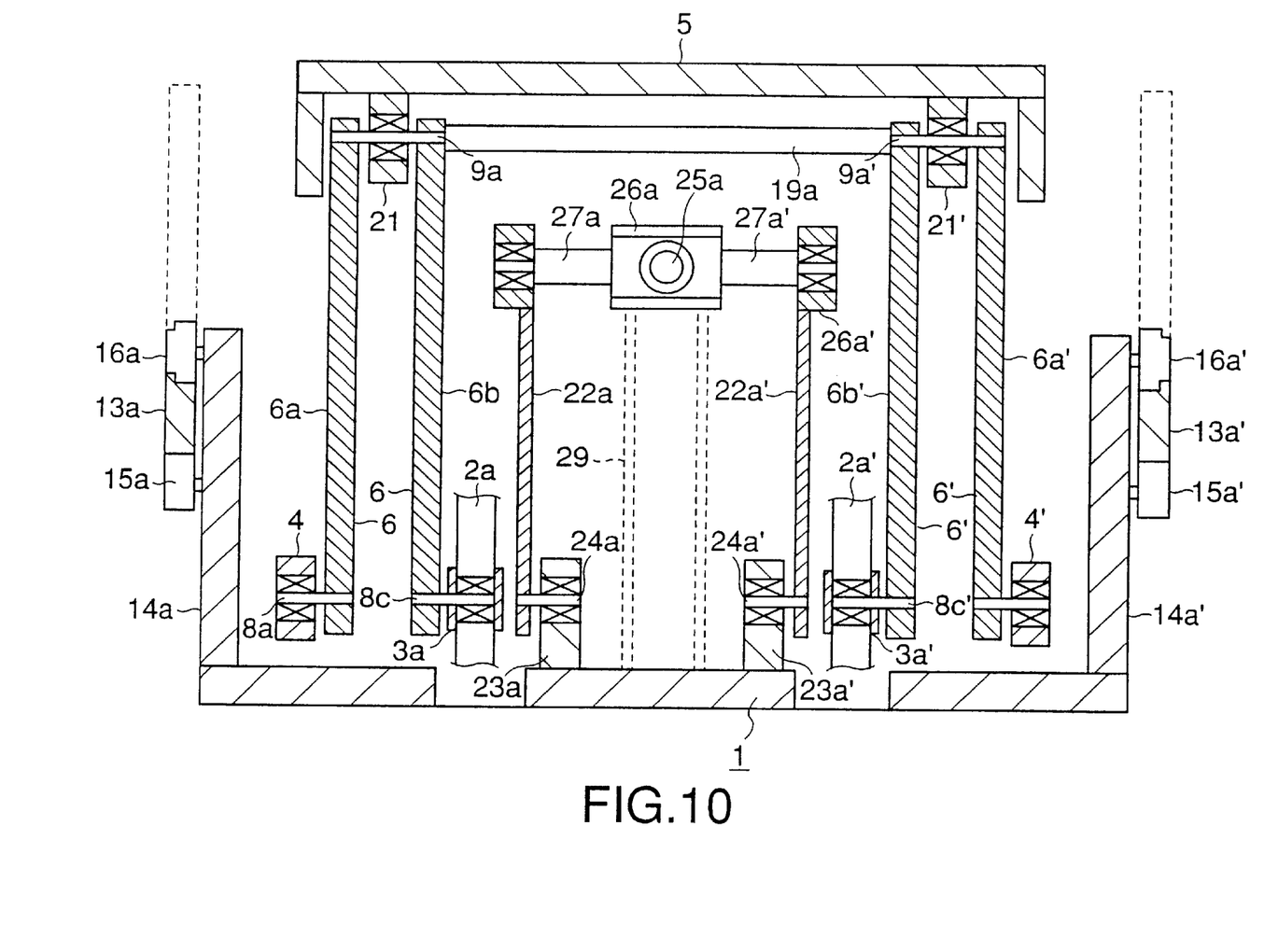
FIG. 10 is a sectional view taken along line 10—10 in FIG. 5.
Figure 11:
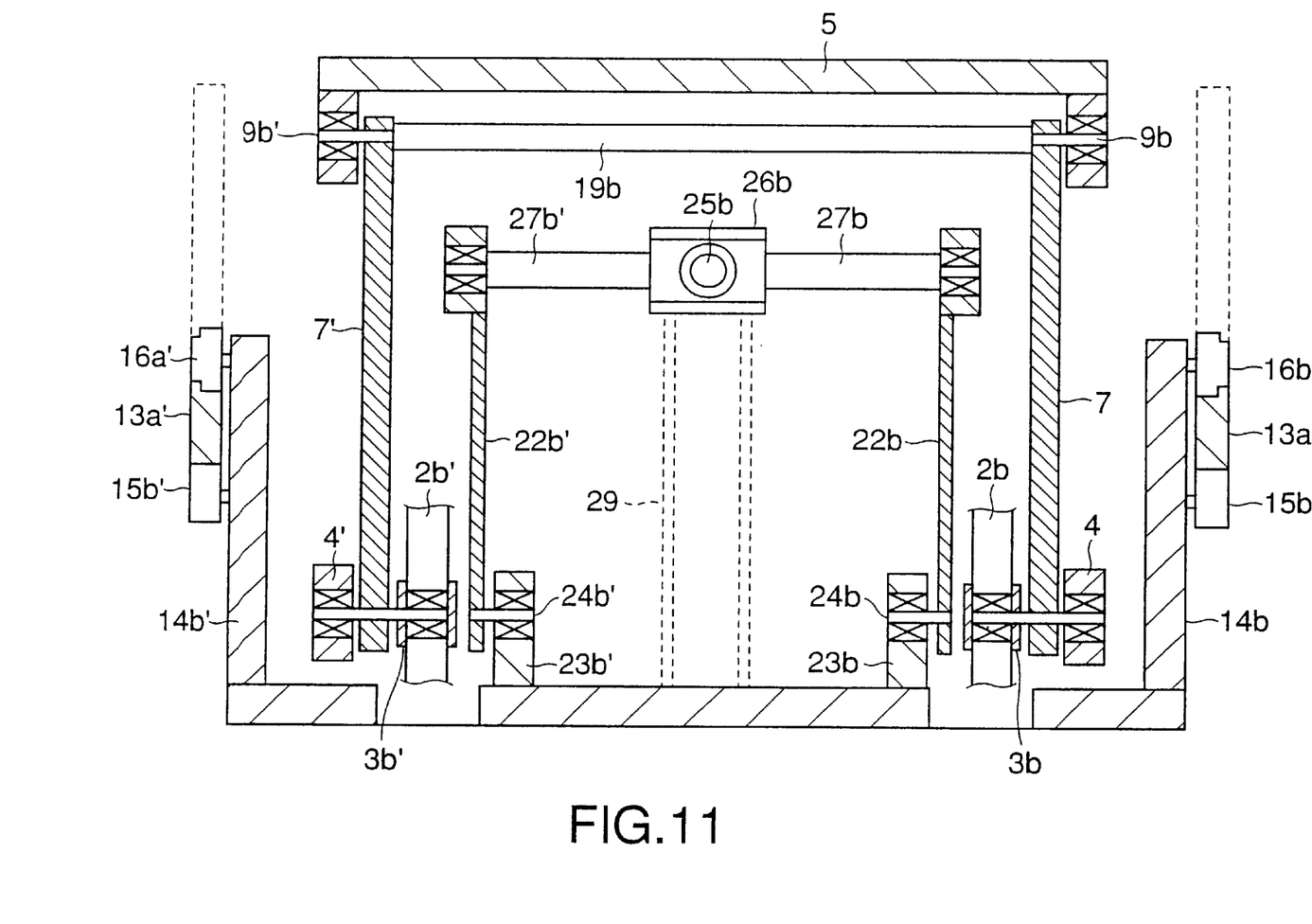
FIG. 11 is a sectional view taken along line 11—11 in FIG. 5.

Also, the parallelogrammic links on both the first and second sides of the pan head need to move together with each other. To this end, as shown in FIGS. 7, 10 and 11, shafts 9a and 9a' of the first vertical links 6 and 6' are integrally coupled together by a common shaft 19a, and shafts 9b and 9b' of the second vertical links 7 and 7' also are integrally coupled together by a common shaft 19b. Further, as shown in FIGS. 5, 7 and 9, intermediate portions of the first vertical links 6 and 6' are connected to each other by a reinforcing plate 20a, and intermediate portions of the second vertical links 7 and 7' are also connected to each other by a reinforcing plate 20b, thereby ensuring rigidity of the links. The shafts 9a and 9a' of the first vertical links 6 and 6' are rotatably supported by respective brackets 21 and 21' fixed to the tilting base 5, as shown in FIGS. 7 and 10.

Further, as shown in FIGS. 9 and 10, the first lateral links 4 and 4' are supported at one end by the members 6a and 6a' constituting the respective first vertical links 6 and 6', via the shafts 8a and 8a', respectively. Specifically, the shaft 8a, 8a' has one end portion rotatably supported through a bearing (indicated by a cross in the figures) by one end of the first lateral link 4, 4', and has the other end portion secured to the member 6a, 6a'. The rollers 3a and 3a' are supported in like manner by the members 6b and 6b' via shafts 8c and 8c', respectively.

Figure 8:
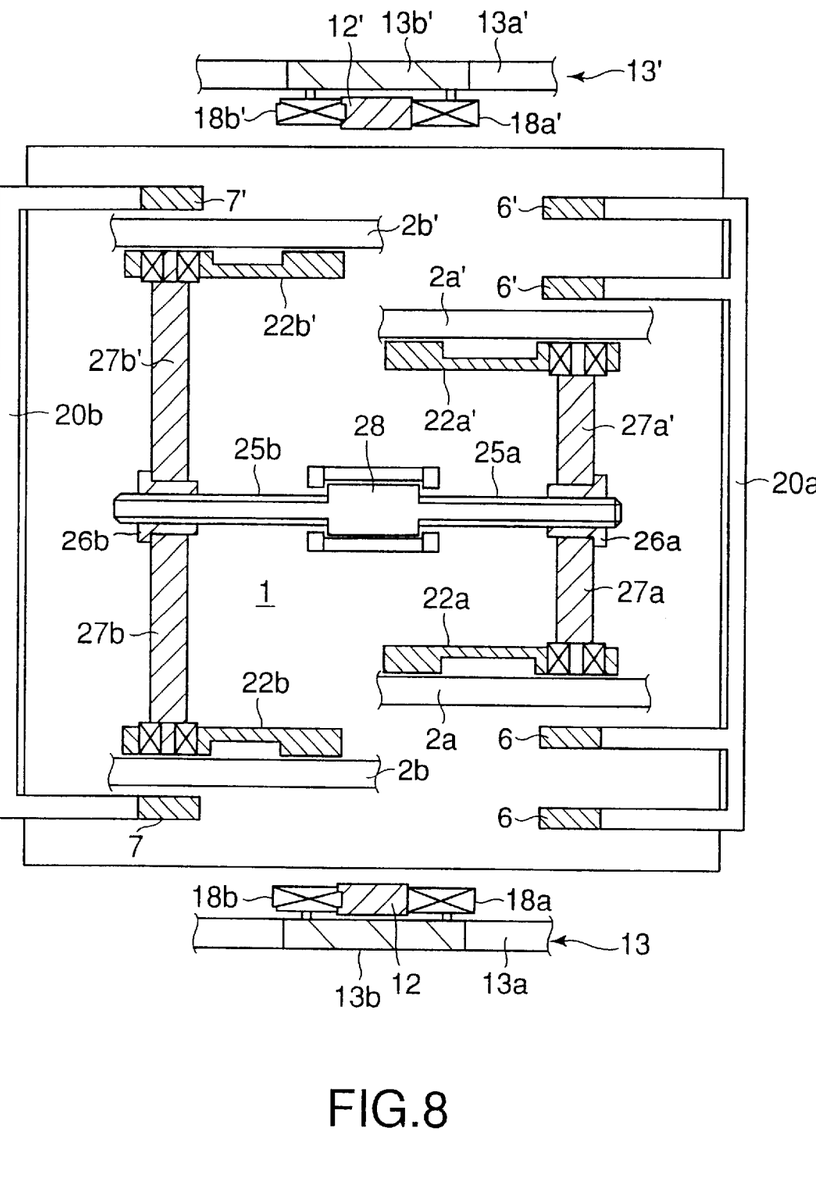
FIG. 8 is a sectional view taken along line 8—8 in FIG. 5.
Figure 12:
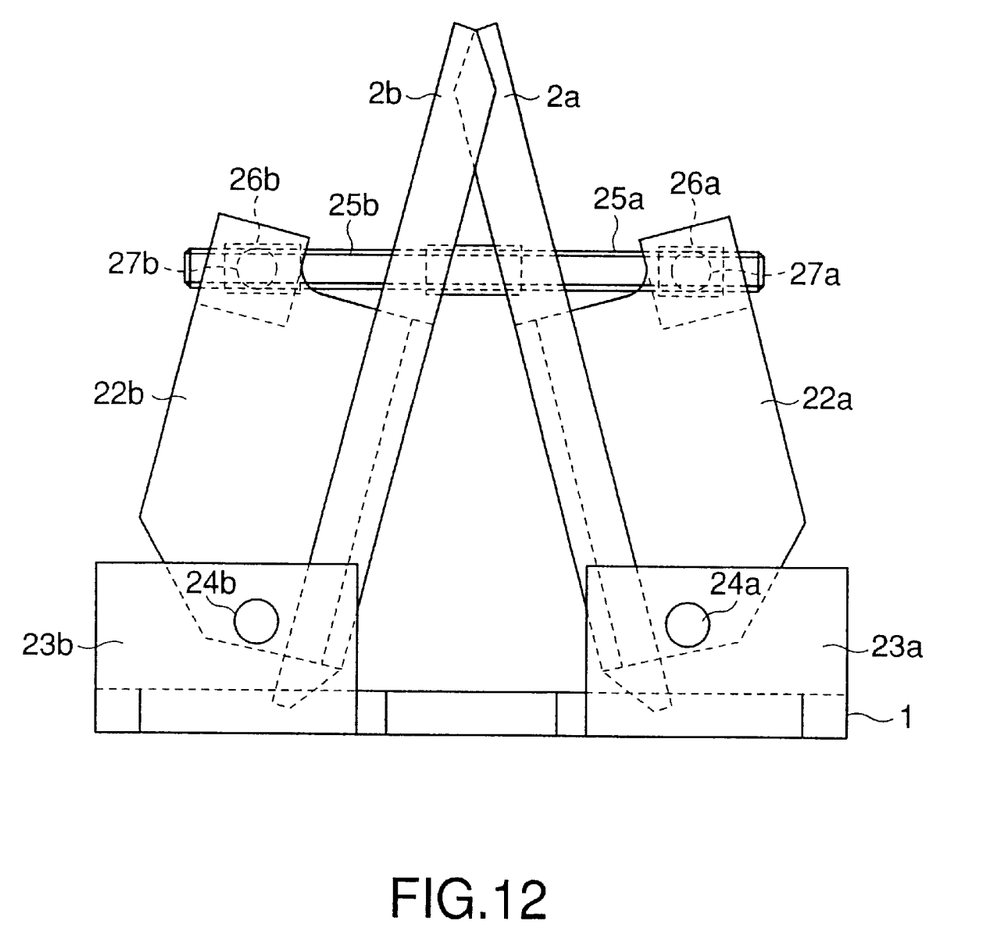
FIG. 12 is a side view of inclined rails appearing in FIG. 5.

FIG. 12 shows a structure whereby the inclined rails 2a and 2b are fixed. The inclined rails 2a and 2b are provided respectively with rail supporting members 22a and 22b. The rail supporting members 22a and 22b have respective lower ends rotatably supported through shafts 24a and 24b by brackets 23a and 23b secured to the base 1. The upper ends of the rail supporting members 22a and 22b are supported through shafts 27a and 27b by nuts 26a and 26b which are fitted on first and second threaded portions 25a and 25b, respectively, of a threaded rod 25. Specifically, as shown in FIGS. 8, 10 and 11, the shafts 27a, 27a' and 27b, 27b', which extend in a direction at right angles to the axis of the threaded rod 25, are secured at one end to the nuts 26a and 26b and are fitted at the other end into respective bearings provided at the upper ends of the rail supporting members 22a, 22a' and 22b, 22b'.

The first and second threaded portions 25a and 25b of the threaded rod 25 have, for example, a right-hand thread and a left-hand thread, respectively, formed thereon, and an intermediate portion 28 of the rod 25 is loosely held by a support 29 fixed to the base 1. Accordingly, as the threaded rod 25 is rotated with a tool such as a screwdriver engaged with a distal end of the first or second threaded portion 25a or 25b, the nuts 26a and 26b move, together with the shafts 27a, 27a' and 27b, 27b', toward or away from each other. As the nuts 26a and 26b move in this manner, the rail supporting members 22a, 22a' and 22b, 22b' turn around their shafts 24a, 24a' and 24b, 24b', so that the inclination of the rails 2a, 2a' and 2b, 2b' changes correspondingly. Thus, the center of gravity of an object placed on the pan head can be positioned appropriately by rotating the threaded rod 25 in accordance with the position of the center of gravity of the object and thereby changing the angle of inclination of the inclined rails 2a, 2a' and 2b, 2b'.

As described above, the first embodiment comprises the first lateral link 4, 4' having opposite ends movable along the inclined rails 2a, 2a' and 2b, 2b', the tilting base 5 as the second lateral link and the first and second vertical links 6, 6' and 7, 7' constituting a parallelogrammic link in cooperation with the first lateral link 4, 4', the third vertical link 12, 12' supporting the parallelogrammic link, and the inverted T-shaped supporting member 13, 13' for horizontally and vertically movably supporting the third vertical link 12, 12' and serving as the orientation control section. Accordingly, when the object placed on the pan head is tilted, the center of gravity thereof shifts horizontally, thus permitting the object to be tilted smoothly.

Also, the use of the parallelogrammic link permits the inclined rails to be arranged without the interference with the object, as well as the tilt angle to be increased.

Further, the angle of inclination of the inclined rails 2a, 2a' and 2b, 2b' can be changed by rotating the threaded rod. Accordingly, compared with conventional pan heads, change in the height of the center of gravity of the object placed on the pan head can be coped with easily and quickly.

In the first embodiment, the supporting member for orientation control is supported by the third vertical link, but it may alternatively be supported by the first or second vertical link.

A second embodiment of the present invention will be now described.

Figure 13:
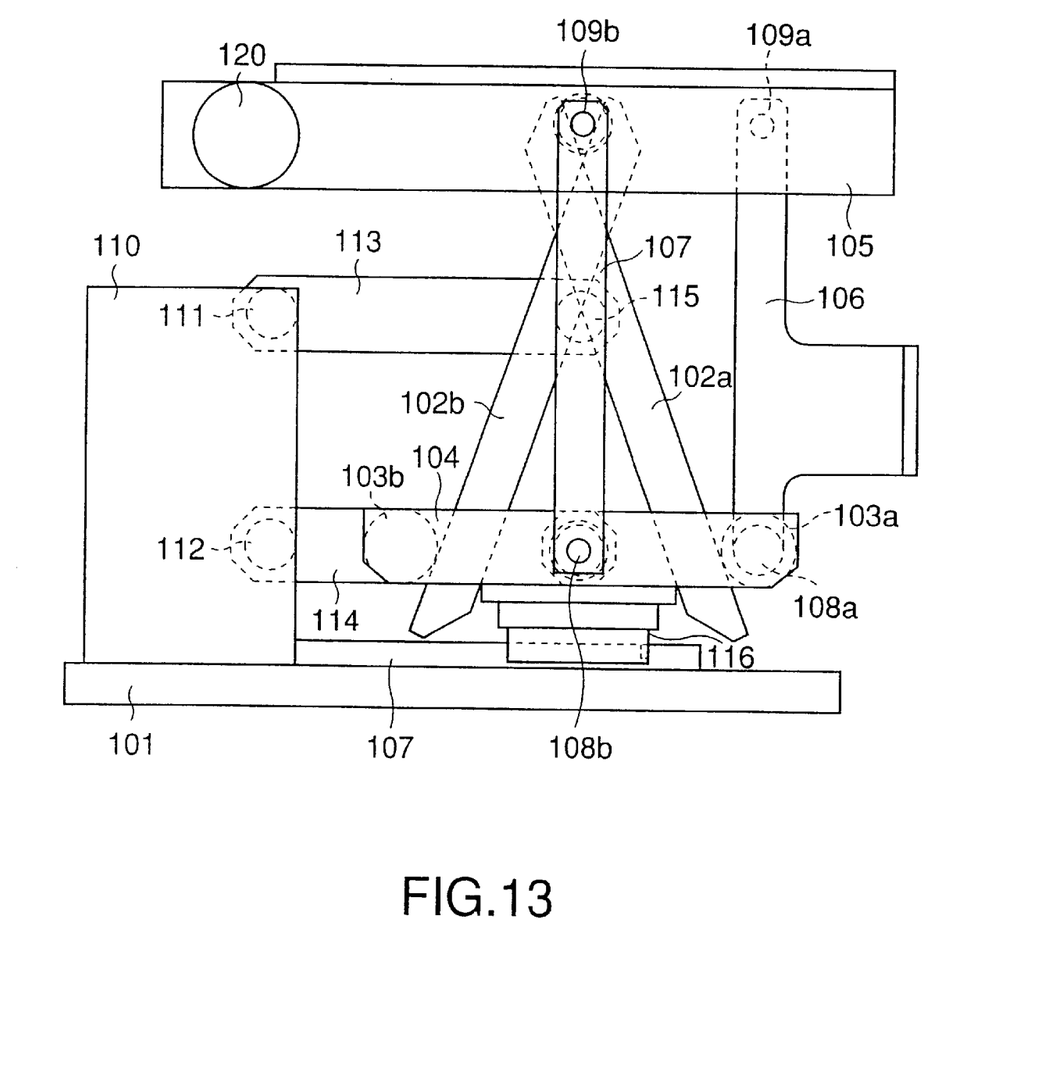
FIG. 13 is a side view of an object carrying device according to a second embodiment of the present invention.

FIG. 13 is a side view showing a first side of an object carrying device according to the second embodiment of the invention. Also in this embodiment, a second side of the device opposite the first side has an arrangement similar to that shown in the figure.

The second embodiment differs from the first embodiment only in the method of orientation control and has a basic structure similar to that of the first embodiment shown in FIG. 5. Specifically, a base 101 is provided with a pair of inclined rails 102a and 102b. Rollers 103a and 103b, which roll on the inclined rails 102a and 102b, are rotatably mounted to opposite end portions of a first lateral link 104 through respective shafts and bearings. A tilting base 105 as a second lateral link is arranged parallel with the first lateral link 104, and first and second vertical links 106 and 107 are each coupled to the first and second lateral links 104 and 105. The links 104, 105, 106 and 107 constitute a parallelogrammic link. The first vertical link 106 has opposite ends rotatably supported through shafts 108a and 109a by one end of the first lateral link 104 and one end portion of the tilting base 105, respectively. The second vertical link 107 has opposite ends rotatably supported through shafts 108b and 109b by intermediate portions of the first lateral link 104 and the tilting base 105, respectively. The roller 103a and the shaft 108a are arranged coaxially with each other.

A supporting member 110 is secured to the base 101 and has a pair of, upper and lower shafts 111 and 112 extending horizontally. The shafts 111 and 112 are positioned in a vertical plane, and lateral links 113 and 114 are rotatably coupled at one end to the respective shafts 111 and 112. A shaft 115 extends from a longitudinally intermediate portion of the second vertical link 107 in a direction perpendicular thereto, and the other end of the lateral link 113 is rotatably coupled to the shaft 115. The other end of the lateral link 114 is rotatably coupled to the aforementioned shaft 108b. Thus, the supporting member 110, the second vertical link 107 and the lateral links 113 and 114 constitute another parallelogrammic link, which forms a principal part of an orientation control section for maintaining vertical orientation of the first and second vertical links 106 and 107. To permit the tilting base 105 to be tilted, the distance between the supporting member 110 and the pair of inclined rails 102a and 102b needs to be changed. To this end, a slider 116 is attached to the bottom of the pair of inclined rails 102a and 102b, and a guide rail 117 for horizontally guiding the slider 116 is attached to the base 101, whereby the pair of inclined rails 102a and 102b is horizontally movable with horizontal movement of the slider 116.

With this arrangement, as the tilting base 105 is tilted, the rollers 103a and 103b of the first lateral link 104 move on the inclined rails 102a and 102b, respectively, with the result that the first lateral link 104 is inclined correspondingly. At this time, the parallelogrammic link constituted by the supporting member 110, the second vertical link 107 and the lateral links 113 and 114 prevents the first and second vertical links 106 and 107 from being inclined, so that the vertical orientation of the links 106 and 107 is maintained.

Figure 14:
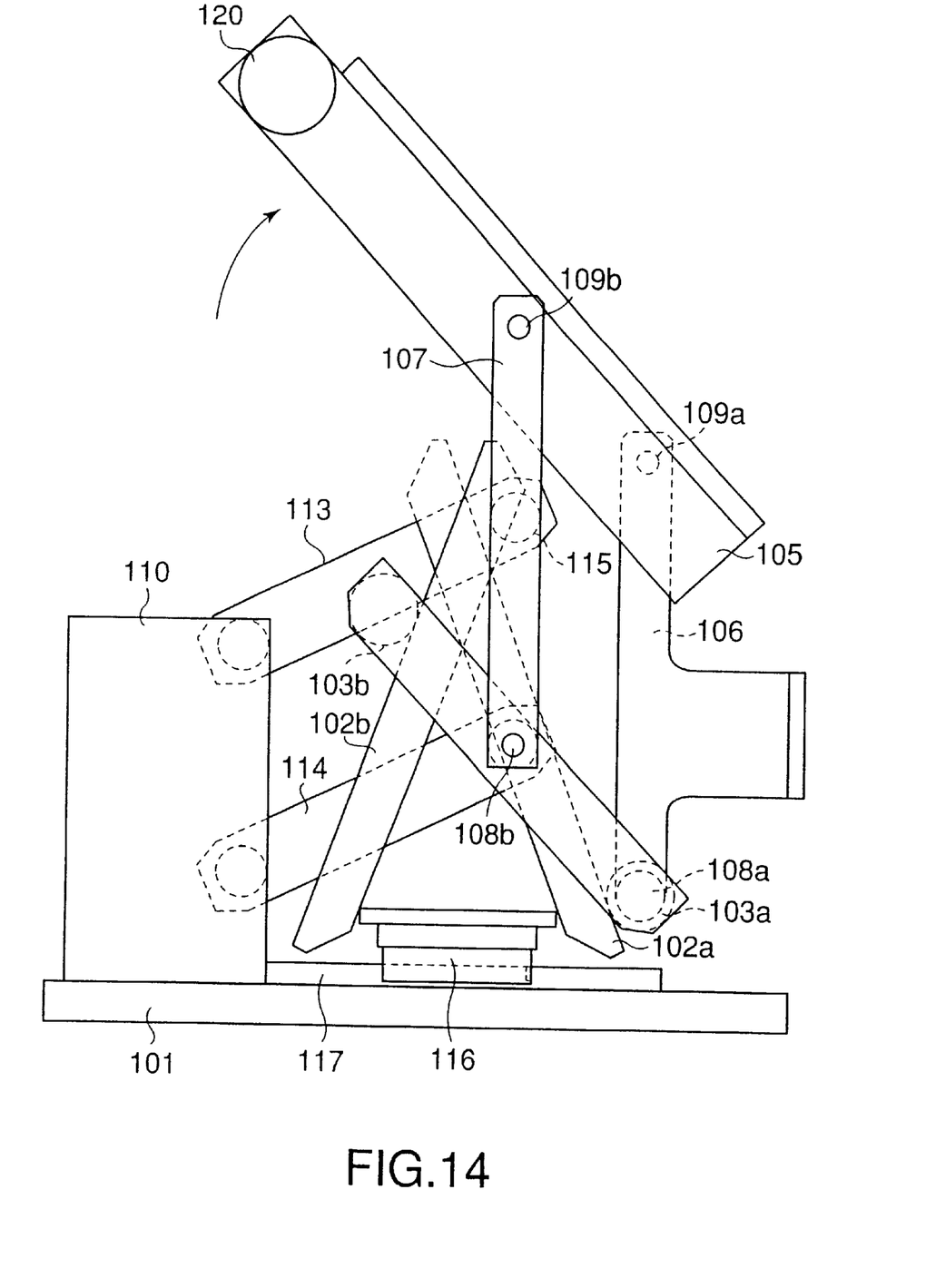
FIG. 14 is a side view of the device shown in FIG. 13, illustrating a tilting base tilted in a clockwise direction.

FIG. 14 shows a state in which the tilting base 105 is tilted clockwise with the rollers 103b and 103a situated at upper and lower portions, respectively, of the inclined rails 102b and 102a. In this case, as the lateral link 104 moves, the second vertical link 107 rises while the lateral links 113 and 114 turn upward, so that the pair of inclined rails 102a and 102b moves toward the supporting member 110. Thus, the orientation control section of the second embodiment has a simpler structure than that of the first embodiment.

Also in this embodiment, the base 101 is fixed to a tripod or the like and a panning mechanism, not shown, is provided to permit the base 101 to swivel round a vertical axis. A TV attachment mechanism, not shown, is also attached to the tilting base 105 to permit a TV camera or the like to be mounted on the base 105. The tilting base 105 is provided with a pan bar mount 120 similar to the pan bar mount 10 of the first embodiment.

In the second embodiment, the pair of inclined rails 102a and 102b is designed to be horizontally movable. Alternatively, the pair of inclined rails 102a and 102b may be fixed and the supporting member 110 may be designed to be horizontally movable instead. Also, in the second embodiment, the parallelogrammic link for orientation control includes the second vertical link 107, but it may include the first vertical link 106 instead. Alternatively, another vertical link coupled to the lateral links 104 and 105 may be additionally provided so that it may constitute part of the parallelogrammic link.

As described above in detail, the present invention provides an object carrying device which enables the center of gravity of an object placed on the device to shift horizontally with tilting of the object and which also requires only a simple operation to cope with change in the height of the center of gravity of the object.

The foregoing embodiments are considered as illustrative only of the technical features of the present invention. It is therefore to be understood that the invention is not to the specific embodiments thereof and that various changes and modifications may be made in the invention without departing from the spirit and scope thereof.

What is claimed is:

1. A tiltable device for carrying an object thereon, comprising:
   a base;
   first and second rails arranged on said base and inclined such that said first and second rails are located close to each other at one end and remote from each other at an other end;
   a first lateral link having opposite ends movably arranged on said first and second rails, respectively;
   a second lateral link parallel to said first lateral link and serving as a tiltable base for carrying an object thereon; and
   first and second vertical links parallel to each other and each rotatably connected to said first and second lateral links for holding said first and second lateral links together.

2. The device according to claim 1, further comprising an orientation control section for always keeping said first and second vertical links oriented at a substantially identical angle.

3. The device according to claim 2, wherein said orientation control section includes a horizontal portion horizontally movable relative to said base, a vertical portion extending vertically from said horizontal portion, and holding means permitting one of said first vertical link, said second vertical link and a third vertical link connected to said first and second lateral links to be vertically movably held by said vertical portion.

4. The device according to claim 2, wherein said orientation control section includes a supporting member arranged on said base, and a pair of lateral links rotatably supported at one end by said supporting member and rotatably supported at the other end by one of said first vertical link, said second vertical link and a third vertical link connected to said first and second lateral links, said supporting member, said pair of lateral links, and said one of said first vertical link, said second vertical link and said third vertical link connected to said first and second lateral links constituting a parallelogrammic link.

5. The device according to claim 4, wherein said orientation control section further includes means for causing relative horizontal movement between said supporting member and said first and second rails.

6. The device according to claim 1, further comprising adjusting means, coupled to said first and second rails, for adjusting an angle of inclination of said first and second rails.

7. The device according to claim 6, wherein said adjusting means includes first and second nuts coupled to said first and second rails, respectively, and a threaded rod having a first threaded portion on which said first nut is fitted, and a second threaded portion on which said second nut is fitted and which has a thread cut in a different direction from that of the first threaded portion.

8. The device according to claim 1, wherein when the second lateral link is tilted, the height of a center of rotation of the second lateral link is altered.

9. The device according to claim 8, further comprising a third vertical link operatively coupled to the first and second vertical links, the third vertical link altering the height of the center of rotation of the second lateral link when the second lateral link is tilted.

* * * * *